United States Patent [19]
Campo et al.

[11] Patent Number: 5,185,913
[45] Date of Patent: Feb. 16, 1993

[54] METHOD OF MAKING A FASTENING MEMBER FOR A HOSE CONSTRUCTION

[75] Inventors: Manuel Campo, Fairfax, Va.; Charles S. Pearson, Waynesville; Jon H. Synder, Hazelwood, both of N.C.

[73] Assignee: Dayco Products, Inc., Dayton, Ohio

[21] Appl. No.: 771,080

[22] Filed: Oct. 2, 1991

[51] Int. Cl.⁵ .............................................. B23P 11/02
[52] U.S. Cl. .................................... 29/453; 29/525.1;
24/283; 24/304; 285/253; 285/915; 285/921; 285/906
[58] Field of Search ............... 24/20 R, 20 EE, 19, 24/304, 283, 279, 270; 285/252, 253, 915, 921, 236, 906; 29/450, 453, 525.1

[56] References Cited

U.S. PATENT DOCUMENTS

| | | | |
|---|---|---|---|
| 541,596 | 6/1895 | Curlett | 285/253 |
| 785,737 | 3/1905 | Jones | 24/283 |
| 2,846,016 | 8/1958 | Hanes | 285/407 X |
| 3,365,218 | 1/1968 | Denyes | 285/253 |
| 3,389,442 | 6/1968 | Tetzlaff | 285/252 X |
| 4,438,960 | 3/1984 | Carroll et al. | 285/921 X |
| 4,453,289 | 6/1984 | Kleykamp et al. | 285/921 X |
| 4,592,576 | 6/1986 | Proctor et al. | 285/252 |
| 4,763,695 | 8/1988 | Dooley | 138/109 |
| 4,763,932 | 8/1988 | Matz | 285/253 X |
| 4,773,129 | 9/1988 | Muhr | 24/20 R |

FOREIGN PATENT DOCUMENTS

| | | | |
|---|---|---|---|
| 2600226 | 7/1977 | Fed. Rep. of Germany | 285/253 |
| 2630808 | 11/1989 | France | 285/253 |

OTHER PUBLICATIONS

Advertisement of Copolymer on p. 11 of the Feb. 18, 1991, issue of "Rubber & Plastic News".

*Primary Examiner*—Dave W. Arola
*Attorney, Agent, or Firm*—Joseph V. Tasone

[57] ABSTRACT

A hose construction, fastening member therefor and methods of making the same are provided, the hose construction comprising a tubular flexible hose having opposite ends and an outer peripheral surface, a fastening member, and a clamping unit fastened to one of the ends of the hose with the fastening member for substantially circumferentially and radially inwardly clamping the one end onto a member that has been inserted into the one end, the fastening member having a part thereof secured to the outer peripheral surface of the hose and having a recess therein that receives part of the clamping unit therein, the fastening member having snap-fit structure for holding the part of the clamping unit in the recess thereof before the fastening member is secured to the hose.

10 Claims, 4 Drawing Sheets

METHOD OF MAKING A FASTENING MEMBER FOR A HOSE CONSTRUCTION

BACKGROUND OF THE INVENTION

1. Field of the Invention

This invention relates to a new hose construction and to a new fastening means for fastening a clamping means to one end of the hose as well as to new methods of making such a hose construction and such a fastening means.

2. Prior Art Statement

It is known to provide a hose construction comprising a tubular flexible hose having opposite ends and an outer peripheral surface means, fastening means, and a clamping means fastened to one of the ends of the hose with the fastening means for substantially circumferentially and radially inwardly clamping the one end onto a member that has been inserted into the one end, the fastening means comprising a fastening member having a part thereof secured to the outer peripheral surface means of the hose and having recess means therein that receives part of the clamping means therein. For example, see the advertisement of Copolymer on page 11 of the Feb. 18, 1991 issue of "Rubber & Plastic News".

Also see the U.S. Pat. No. to Denyes, 3,365,218 for various means for fastening a clamping member to an end of a hose.

Also see the U.S. Pat. No. to Dooley, 4,763,695; the U.S. Pat. No. to Proctor et al, 4,592,576 and the U.S. Pat. No. to Muhr, 4,773,129 for different types of annular clamping means for substantially circumferentially and radially inwardly clamping one end of a hose onto a member that has been inserted into that one end of the hose.

SUMMARY OF THE INVENTION

It is one feature of this invention to provide a new hose construction having unique fastening means that fastens a clamping means to one of the ends of the hose so that the clamping means can substantially circumferentially and radially inwardly clamp the one end of the hose onto a member that has been inserted into that one end of the hose.

In particular, it is found according to the teachings of this invention that the fastening means can be so constructed and arranged that the same can have means for holding a part of the clamping means in a recess means thereof before that fastening means is secured to the hose.

For example, one embodiment of this invention comprises a hose construction comprising a tubular flexible hose having opposite ends and an outer peripheral surface means, fastening means, and a clamping means fastened to one of the ends of the hose with the fastening means for substantially circumferentially and radially inwardly clamping the one end onto a member that has been inserted into the one end, the fastening means comprising a fastening member having a part thereof secured to the outer peripheral surface means of the hose and having recess means therein that receives part of the clamping means therein, the fastening member having means for holding the part of the clamping means in the recess means before the fastening member is secured to the hose.

Accordingly, it is an object of this invention to provide a new hose construction having one or more of the novel features of this invention as set forth above or hereinafter shown or described.

Another object of this invention is to provide a new method of making such a hose construction, the method of this invention having one or more of the novel features of this invention as set forth above or hereinafter shown or described.

Another object of this invention is to provide a new fastening means for such a hose construction, the fastening means of this invention having one or more of the novel features of this invention as set forth above or hereinafter shown or described.

Another object of this invention is to provide a new method of making such a fastening means, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
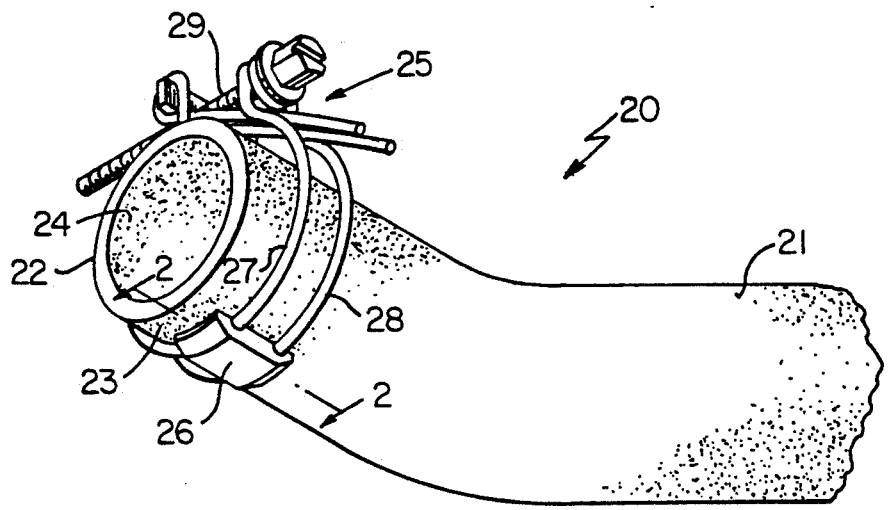
FIG. 1 is a fragmentary perspective view illustrating a new hose construction of this invention.

While the various features of this invention are hereinafter illustrated and described as being particularly adapted to provide hose constructions respectively utilizing three different types of annular clamping means, it is to be understood that the various features of this invention can be utilized singly or in various combinations thereof to provide hose constructions having other types of annular clamping means as desired.

Therefore, this invention is not to be limited to only the embodiments illustrated in the drawings, because the drawings are merely utilized to illustrate some of the wide variety of uses of this invention.

Figure 2:
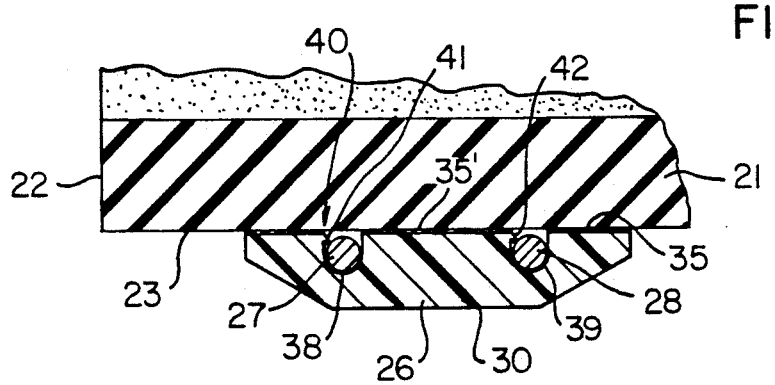
FIG. 2 is an enlarged fragmentary cross-sectional view taken on line 2—2 of FIG. 1.
Figure 3:
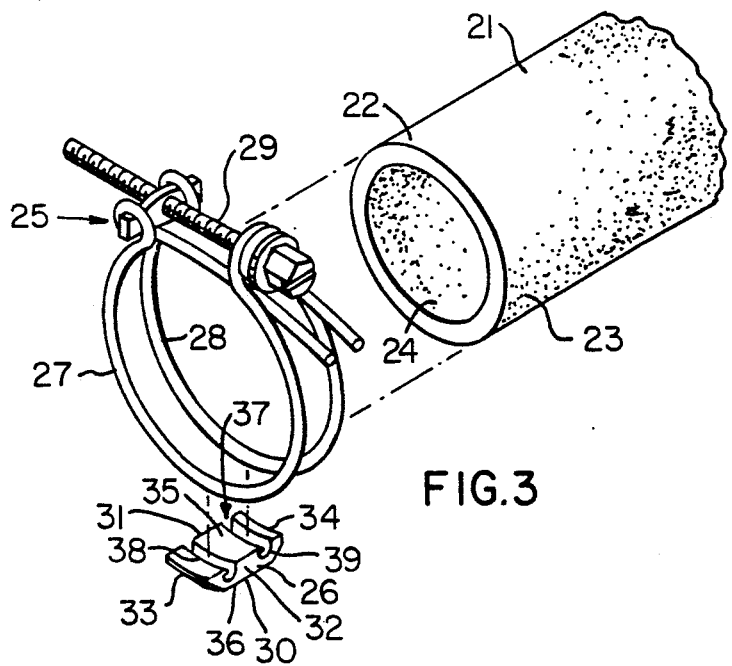
FIG. 3 is a fragmentary exploded perspective view of the various parts of the hose construction of FIGS. 1 and 2.

Referring now to FIGS. 1, 2 and 3, a new hose construction of this invention is generally indicated by the reference numeral 20 and comprises a flexible hose 21 having opposed ends of which only one end 22 is illustrated in the drawings. However, it is well known that the other end of the hose 21 can be similar to the end 22 or dissimilar thereto as desired.

While the flexible hose 21 can be formed of any suitable material and have any suitable configuration, the hose 21 is illustrated in the drawings as being formed of polymeric material and having a generally cylindrical external peripheral surface means 23 and a generally circular opening 24 passing therethrough whereby the end 22 of the hose 21 is adapted to receive a tubular member (not shown) in the opening 24 at the end 22 thereof and have the end 22 substantially circumferentially and radially inwardly clamped onto such tubular member by an annular clamping means that is generally indicated by the reference numeral 25 in FIGS. 1-6 and being secured to the end 22 of the hose 21 by a fastening means 26 of this invention in a manner hereinafter set forth.

Of course, the non-shown end of the hose 21 can also have such clamping means 25 and fastening means 26, if desired.

The annular clamping means 25 is of the type set forth in the aforementioned U.S. Pat. No. to Proctor et al, 4,592,576, whereby this patent is being incorporated into this disclosure by this reference thereto, such clamping member also being shown in the aforementioned U.S. Pat. No. to Denyes, 3,365,218, and being illustrated in FIG. 10 thereof in its clamping condition for clamping an end of a hose onto a tubular member inserted therein whereby this patent is also being incorporated into this disclosure by this reference thereto.

Therefore, since the structure and operation of the annular clamping means 25 is well known in the art, only the details thereof that are necessary to understand the various features of this invention will now be set forth.

As illustrated in the drawings, the annular clamping means 25 includes a pair of spaced apart parallel and substantially circular rod-like members 27 and 28 that are adapted to be circumferentially enlarged or contracted upon the rotation of a threaded fastening member 29 in the proper direction thereof.

The fastening means 26 of this invention comprises a fastening member 30 that is formed of any suitable material, such as a polymeric material as illustrated in the drawings, and having been premolded or otherwise formed to define two pairs of opposed side edge means 31, 32 and 33, 34 and opposed surface means 35 and 36 with the surface means 35 being arcuate between the side edges 31 and 32 thereof so as to substantially conform to the contour of the peripheral surface means 23 of the end 22 of the hose 21 when the fastening member 30 is oriented relative thereto in the manner illustrated in FIGS. 1 and 2.

The surface means 35 of the fastening member 30 of this invention is interrupted by recess means that is generally indicated by the reference numeral 37 and which extends between the opposed side edges 31 and 32, the recess means 37 for the fastening member 30 comprising two like recesses 38 and 39 disposed in spaced apart parallel relation and being adapted to respectively receive parts of the circular rods 27 and 28 therein in the manner illustrated in FIGS. 1, 2, 4 and 5 so that the uninterrupted portions of the surface means 35 of the fastening member 30 will engage flush against the outer peripheral surface 23 of the end 22 of the hose 21 in the manner illustrated in FIG. 2.

Figure 4:
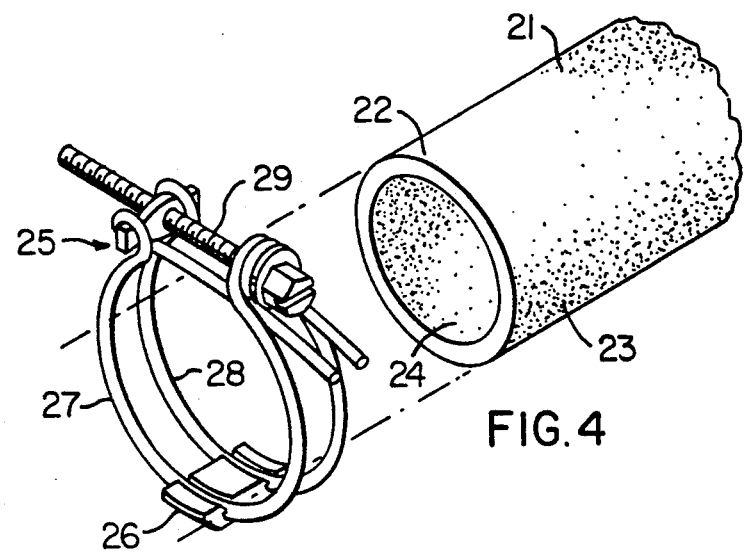
FIG. 4 is a view similar to FIG. 3 and illustrates the fastening means of this invention assembled with the annular clamping means before the annular clamping means is disposed on the end of the flexible hose.
Figure 5:
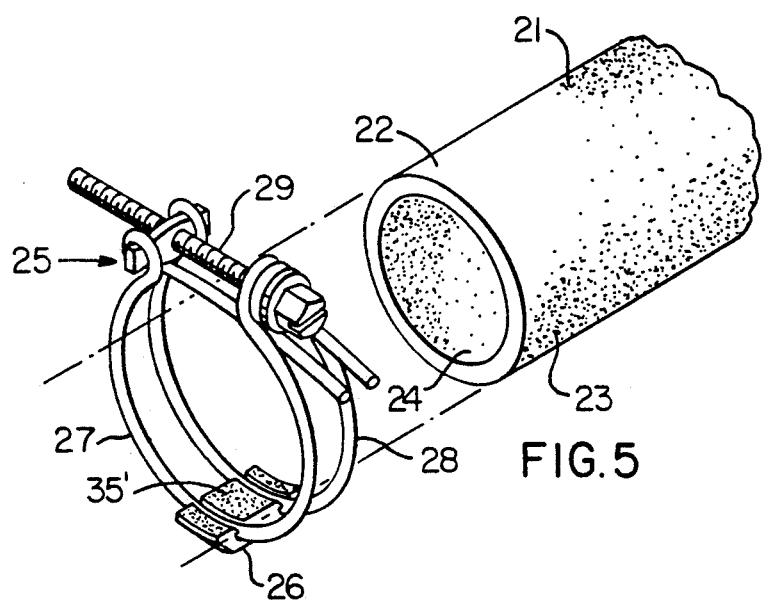
FIG. 5 is a view similar to FIG. 4 and illustrates the placing of an adhesive means on the fastening means.

The fastening member 30 of this invention is adapted to be assembled with the clamping means 25 before the fastening member 30 is secured to the hose 21 and has means that is generally indicated by the reference numeral 40 for holding the parts of the rods 27 and 28 in the recesses 38 and 39 before the clamping means 25 is assembled with the end 22 of the hose 21, such holding means 40 comprising integral projections 41 and 42 of the fastening member 30 that respectively extend over part of the recesses 38 and 39 throughout the entire length thereof so as to provide snap-fit means beyond which the rods 27 and 28 must be pushed in a snap-fit manner as illustrated in FIG. 2 so that the fastening member 30 in such assembled relation will be carried by the clamping means 25 in the manner illustrated in FIGS. 4 and 5.

In this manner, a suitable adhesive means 35', FIG. 5, can be disposed on the noninterrupted portions of the surface means 35 of the fastening member 30. Thereafter the assembled clamping means 25 and fastening member 30 can be disposed in the telescoped relation over the end 22 of the hose 21 in the manner illustrated in FIG. 6 and have the surface means 35 of the fastening member 30 urged against the peripheral surface 23 of the end 22 of the hose 21 in the desired position thereof so that the fastening member 30 will be bonded to the end 22 of the hose 21 in a proper position by the adhesive means 35' when set to hold the clamping means 25 in its assembled relation with the hose 21 for subsequently clamping the end 22 of the hose 21 onto the desired tubular structure in the manner set forth in the aforementioned U.S. patents that have been previously incorporated by reference into this disclosure.

Figure 6:
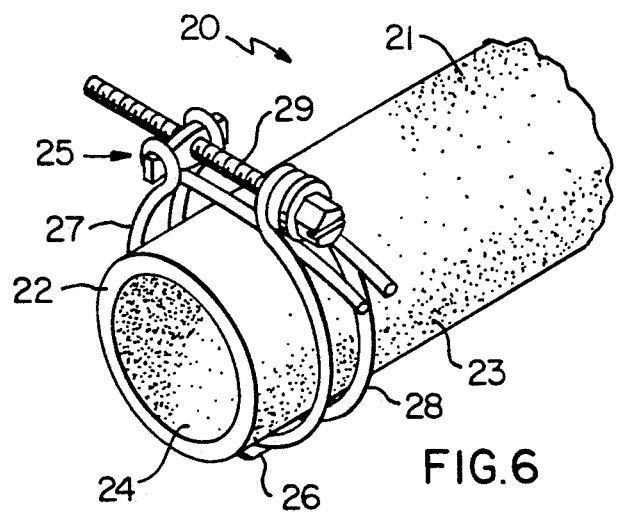
FIG. 6 is a view similar to FIG. 5 and illustrates the clamping means having been telescoped onto the end of the hose.

Thus, it can be seen that it is a relatively simple method of this invention to form the hose construction 20 by first having the clamping means 25 disposed in a sufficiently open condition thereof so that the same can readily slip onto the end 22 of the hose 20 after the fastening member 30 has been snap-fitted onto the rods 27 and 28 thereof as illustrated in FIG. 4 and the adhesive means 35' has been placed on the surface means 35 of the fastening member 30 so that the fastening member 30 can be subsequently secured to the surface means 23 of the hose 21 with the clamping means 25 disposed in the proper position over the end 22 of the hose 21 in the manner illustrated in FIGS. 1, 2 and 6.

Once the adhesive means 35' has been set, the clamping means 25 can be circumferentially tightened by rotating the fastening means 29 in the proper direction in a manner well known in the art in order to circumferentially and radially inwardly compress the end 22 of the hose 21 in a manner well known in the art. Of course, in order to remove the end 22 of the hose construction 20 from the desired structure, the fastening means 29 is rotated in the proper direction to circumferentially expand the clamping means 25 so that the end 22 of the hose 21 can then be untelescoped from the tubular structure on which the end 22 had been fastened.

Therefore, it can be seen that by providing the holding means 40 on the fastening member 30 of this invention, it is a relatively simple method to assemble the fastening member 30 with the clamping means 25 before the clamping means 25 is assembled with the hose 21 so as to minimize the difficulty in fastening the clamping means 25 to the end 22 of the hose 21 to produce the final assembly as illustrated in FIG. 1.

Figure 7:
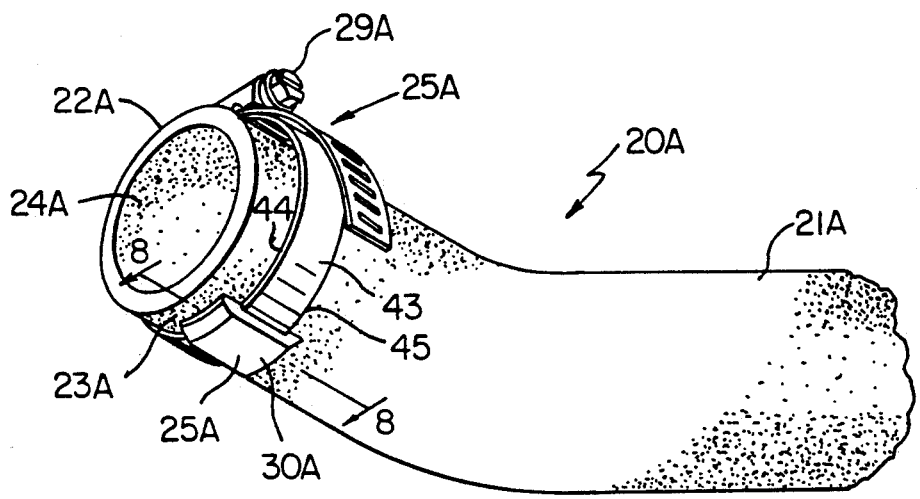
FIG. 7 is a view similar to FIG. 1 and illustrates another new hose construction of this invention.
Figure 8:
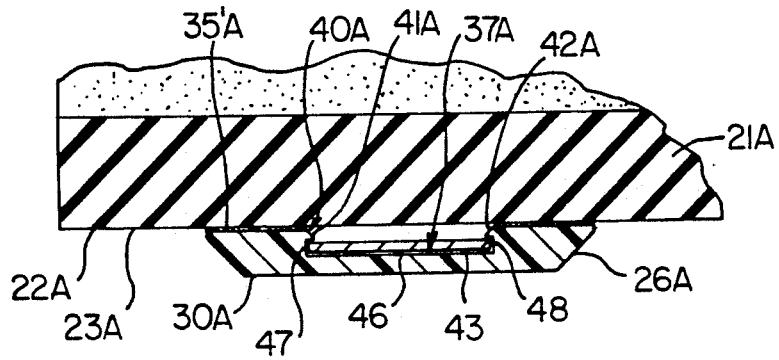
FIG. 8 is an enlarged fragmentary cross-sectional view taken on line 8—8 of FIG. 7.
Figure 9:
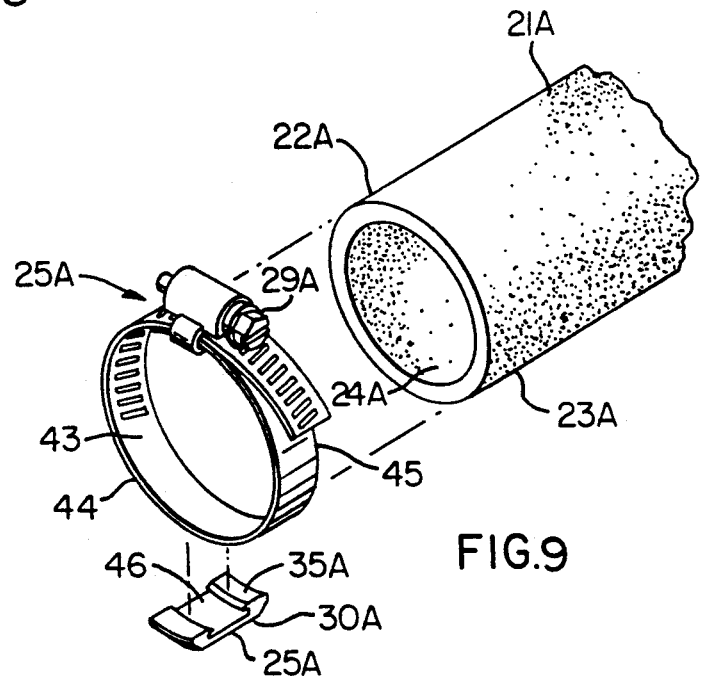
FIG. 9 is a fragmentary exploded perspective view illustrating the various parts of the hose construction of FIGS. 7 and 8.

Another hose construction of this invention is generally indicated by the reference numeral 20A in FIGS. 7-9 and parts thereof similar to the parts of the hose construction 20 previously described are indicated by like reference numerals followed by the reference letter "A".

As illustrated in FIGS. 7-9, the hose construction 20A also comprises a flexible hose 21A having an annular clamping means 25A fastened to the external peripheral surface means 23A of an end 22A thereof by a fastening means 26A of this invention that comprises a fastening member 30A having a recess means 37A interrupting the surface 35A thereof.

However, the clamping means 25A includes an annular flat band 43 that has opposed parallel side edges 44 and 45 whereby the recess means 37A in the fastening member 30A of this invention comprises a single recess 46 having opposed side edges 47 and 48 respectively provided with holding means 40A that comprises inwardly directed integral ledges or portions 41A and 42A of the fastening member 30A that extend the entire length of the recess 46 and will overlap the opposed side edges 44 and 45 of the band 43 of the clamping means 25A when a part of that band 43 is snap-fitted down into the recess 46 in the manner illustrated in FIG. 8 whereby the fastening member 30A will be held to the band 43 to be subsequently secured to the surface 23A of the end 22A of the hose 21A by the adhesive means 35'A that was placed on the surface means 35A before the assembled clamping means 25A and fastening member 30A are assembled with the end 22A of the hose 21A in a manner similar to the assembly method of this invention set forth in FIGS. 4-6 for the clamping means 25.

The clamping means 25A is of the type set forth in the aforementioned U.S. Pat. No. to Dooley, 4,763,695, whereby this patent is being incorporated into this disclosure by this reference thereto.

Therefore, it can be seen that it is well known that the clamping means 25A is adapted to have the annular band 43 circumferentially shrunk around the end 22A of the hose 21A by turning a threaded fastening member 29A in the proper direction for fastening the end 22A of the hose 21A onto a desired tubular structure that has been inserted into the opening 24A of the hose 21A in a manner well known in the art. Of course, the annular band 43 can be circumferentially enlarged by turning the threaded fastening member 29A in the opposite direction in order to remove the previously changed end 22A.

Figure 10:
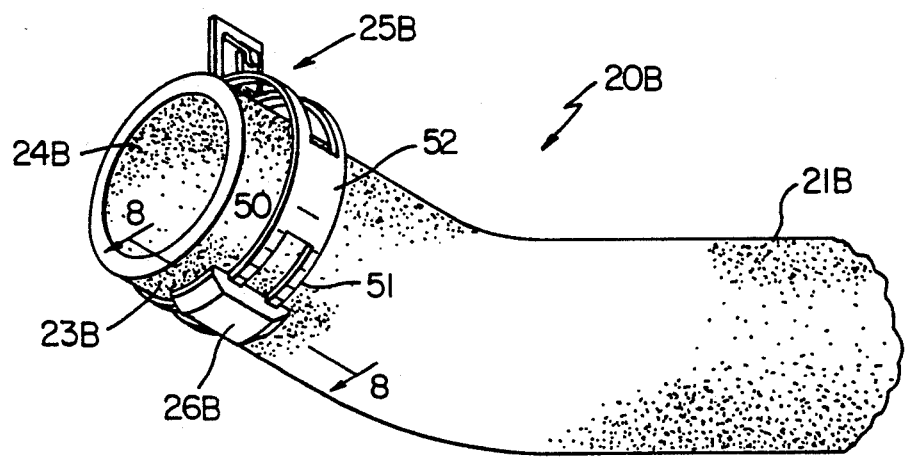
FIG. 10 is a view similar to FIG. 1 and illustrates another new hose construction of this invention.
Figure 11:
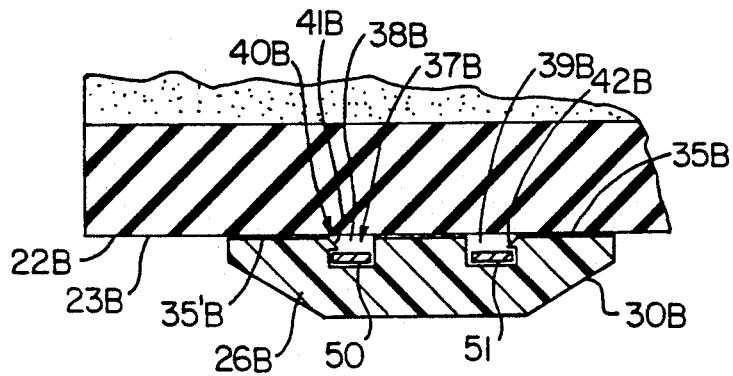
FIG. 11 is an enlarged fragmentary cross-sectional view taken on line 11—11 of FIG. 10.
Figure 12:
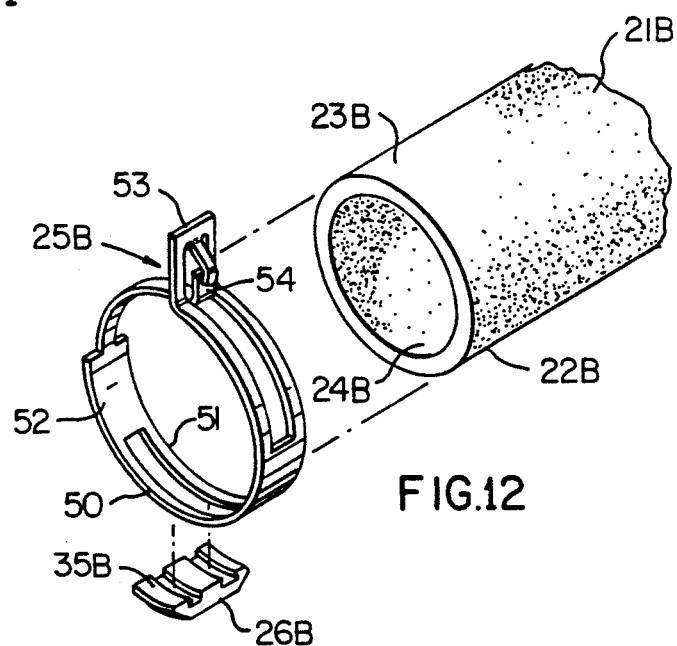
FIG. 12 is an exploded fragmentary perspective view of the various parts that form the hose construction of FIGS. 10 and 11.

Another hose construction of this invention is generally indicated by the reference numeral 20B in FIGS. 10-12 and parts thereof similar to the parts of the hose constructions 20 and 20A previously described are indicated by like reference numerals followed by the reference letter "B".

As illustrated in FIGS. 10-12, it can be seen that the hose construction 20B comprises a flexible hose 21B having an annular clamping means 25B secured to the end 22B thereof by a fastening means 26B of this invention that comprises a fastening member 30B having recess means 37B interrupting the surface means 35B thereof, the recess means 37B comprising two recesses 38B and 39B which respectively receive flat, parallel and spaced apart sections 50 and 51 of an annular band 52 of the clamping means 25B in the manner illustrated in FIG. 11.

The fastening member 30B has holding means 40B for holding the sections 50 and 51 in the recesses 38B and 39B and comprises inwardly directed integral barb-like portions 41B and 42B that extend throughout the entire length of the recesses 38B and 39B and through which the sections 50 and 51 must be snapped in a snap-fit manner so that the fastening member 30B will be carried by the annular band 52 to be subsequently secured to the outer peripheral surface 23B of the hose 21B by the adhesive means 35'B that has been disposed on the surface means 35B in the manner previously set forth for the hose constructions 20 and 20A.

The annular clamping means 25B of the hose construction 20B is of the toggle-type that is set forth in the aforementioned U.S. Pat. No. to Muhr, 4,773,129, whereby this patent is being incorporated into this disclosure by this reference thereto.

Therefore, it can be seen that it is well known that when opposed end means 53 and 54 of the annular band 52 of the clamping means 26B are toggled together in the manner illustrated in FIG. 12, the annular band 52 is in its enlarged circumferential condition to readily permit the same to be slipped onto the end 22 of the hose 21B in the manner illustrated in FIG. 10 so as to be secured thereto by the adhesive 35'B on the fastening member 30B. Thereafter, when the ends 53 and 54 are untoggled from each other, the annular band 52 circumferentially shrinks through the natural spring force of the band 52 to thereby circumferentially and radially inwardly collapse the end 22B of the hose 21B onto the desired tubular structure that is inserted into the opening 24B of the hose 21B in a manner well known in the art.

Therefore, it can be seen that the various hose constructions 20-20B of this invention each has a fastening member 30-30B which permits the annular clamping means 25-25B thereof to be respectively snap-fitted thereto so that the fastening member 30-30B can be subsequently secured in its snap-fit manner with the particular clamping means 25-25B into the desired position thereof onto the respective hose 21-21B in the manner previously set forth.

If desired, the recess means 37-37B can be so constructed and arranged that the same will prevent through friction the respective annular clamping means 25-25B from being rotated relative to the fastening member 30-30B after the fastening member 30-30B has been snap-fitted thereon and before or after the resulting assembly has been secured to the hose 21-21B or the recess means 37-37B can be so constructed and arranged that the annular clamping means 25-25B can be freely rotated relative to the respective fastening member 30-30B within certain limits depending upon the particular structure of the clamping means 25-25B as is apparent from the drawings after the fastening member 30-30B has been snap-fitted thereon and before or after the resulting assembly has been secured to the hose 21-21B.

In particular, the respective recess means 37-37B can be so narrow and/or so shallow that after the respective clamping means 25-25B has been snap-fitted therein beyond the respective by friction from being slideable on the respective clamping means 25-25B.

Therefore, it can be seen that this invention not only provides a new hose construction and a new fastening means for fastening a clamping means onto the hose of the hose construction, but also this invention provides a new method of making such a hose construction and a new method of making such a fastening means.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making a hose construction comprising a tubular flexible hose having opposite ends and an outer peripheral surface means, fastening means, and a clamping means fastened to one of said ends of said hose with said fastening means for substantially circumferentially and radially inwardly clamping said one end onto a member that has been inserted into said one end, said fastening means comprising a fastening member having a part thereof engaging and secured to said outer peripheral surface means of said hose and having recess means therein that receives part of said clamping means therein, the improvement comprising the steps of forming said fastening member with means for holding said part of said clamping means in said recess means before said fastening member is secured to said hose, the step of forming said fastening member with means for holding said part of said clamping means in said recess means comprising the step of forming said means for holding as a snap-fit means, and forming said fastening member to have a surface means disposed between opposed ends thereof with said surface means having said recess means therein and with said surface means defining said part of said fastening member that is secured to said hose.

2. A method of making a hose construction as set forth in claim 1 and including the step of forming said recess means to interrupt said opposed ends of said fastening member.

3. A method of making a hose construction as set forth in claim 2 wherein said recess means comprises a single recess.

4. A method of making a hose construction as set forth in claim 2 wherein said recess means comprises a plurality of recesses disposed in spaced apart substantially parallel relation.

5. A method of making a hose construction as set forth in claim 2 wherein said surface means of said fastening member is arcuate between said opposed ends.

6. In a method of making a fastening means for a hose construction comprising a tubular flexible hose having opposite ends and an outer peripheral surface means, and a clamping means fastened to one of said ends of said hose with said fastening means for substantially circumferentially and radially inwardly clamping said one end, said a member that has been inserted into said one end, said fastening means comprising a fastening member having a part thereof adapted to be engaged against and secured to said outer peripheral surface means of said hose and having recess means therein that is adapted to receive part of said clamping means therein, the improvement comprising the steps of forming said fastening member with means for holding said part of said clamping means in said recess means before said fastening member is secured to said hose, the step of forming said fastening member with means for holding said part of said clamping means in said recess means comprising the step of forming said means for holding as a snap-fit means, and forming said fastening member to have a surface means disposed between opposed ends thereof with said surface means having said recess means therein and with said surface means defining said part of said fastening member that is secured to said hose.

7. A method of making a fastening means for a hose construction as set forth in claim 6 and including the step of forming said recess means to interrupt said opposed ends of said fastening member.

8. A method of making a fastening means for a hose construction as set forth in claim 7 wherein said recess means comprises a single recess.

9. A method of making a fastening means for a hose construction as set forth in claim 7 wherein said recess means comprises a plurality of recesses disposed in spaced apart substantially parallel relation.

10. A method of making a fastening means for a hose construction as set forth in claim 7 wherein said surface means of said fastening member is arcuate between said opposed ends.

* * * * *